United States Patent [19]

Gaiser et al.

[11] 4,455,832

[45] Jun. 26, 1984

[54] MASTER CYLINDER

[75] Inventors: Robert F. Gaiser, Stevensville; Larry G. Lohraff, Berrien Springs, both of Mich.; Lawrence R. Myers, South Bend, Ind.

[73] Assignee: The Bendix Corporation, Southfield, Mich.

[21] Appl. No.: 298,707

[22] Filed: Sep. 2, 1981

[51] Int. Cl.³ .............................................. B60T 11/22
[52] U.S. Cl. ......................................... 60/581; 60/562; 60/588; 60/589; 60/591; 60/592; 60/585
[58] Field of Search ................. 60/562, 581, 585, 588, 60/589, 591, 592; 137/574, 576

[56] References Cited

U.S. PATENT DOCUMENTS

| 2,547,233 | 4/1951 | Seppmann | 60/591 |
| 2,552,033 | 5/1951 | Bradbury | 60/589 |
| 3,522,706 | 8/1968 | Bueler | 60/562 |
| 3,795,111 | 3/1974 | Haraikawa | 60/589 |
| 3,913,327 | 10/1975 | Shellhause | 137/118 |
| 3,969,898 | 7/1976 | Fulmer | 60/592 |
| 4,154,260 | 5/1979 | Shutt | 60/591 |
| 4,249,381 | 2/1981 | Gaiser | 60/589 |

FOREIGN PATENT DOCUMENTS

| 89334 | 12/1972 | Fed. Rep. of Germany . |
| 1012387 | 12/1965 | United Kingdom . |
| 2032554 | 5/1980 | United Kingdom . |

Primary Examiner—Robert E. Garrett
Assistant Examiner—Scott L. Moritz
Attorney, Agent, or Firm—Paul David Schoenle; Ken C. Decker

[57] ABSTRACT

A master cylinder includes a housing (22) with a bore (24) for receiving a pair of pistons (36, 38). The housing defines a reservoir (28) with an outer wall (26). The housing also defines at least one outlet passage (62, 66) communicating fluid from the bore (24) to a brake assembly (16). The outlet passage (62, 66) is partially defined by a boss (60) formed integrally with the housing (22) and the boss (60) cooperates substantially with the outer wall (26) to separate the reservoir (28) into a pair of cavities (84, 86).

3 Claims, 4 Drawing Figures

MASTER CYLINDER

This invention relates to a master cylinder, and, more particularly a master cylinder with a die cast housing forming a bore for receiving a movable pair of pistons and also forming a reservoir for carrying a fluid.

A master cylinder which is die cast from a metal such as aluminum forms a longitudinally extending housing with a bore therein. A pair of pistons are disposed within the bore to substantially form a pair of pressure chambers which communicate with respective brake assemblies. The pair of pistons cooperate with a pair of seals to close communication between the reservoir and the pair of pressure chambers during braking so that pressurized fluid will be communicated from the master cylinder to the brake assemblies.

If a split system master cylinder is required two outlet ports lead from each pressure chamber. One outlet port communicates with a front wheel brake assembly, while the other outlet port communicates with a rear wheel brake assembly. Furthermore, if a proportioning valve is positioned within the outlet port communicating with the rear wheel assembly, the outlet port will require an enlarged boss extending from the longitudinally extending body, thereby increasing the size of the master cylinder housing. This increase in size presents a problem for vehicle manufacturers because the reduction in size required for more efficient automobiles also reduces the available space within an engine compartment for accommodating a master cylinder mounted on a firewall of the engine compartment.

The prior art is illustrated in U.S. Pat. No. 4,249,381, Robert F. Gaiser, issued Feb. 10, 1981; U.S. Pat. No. 4,154,260, Paul B. Schutt, issued May 15, 1979; and U.S. Pat. No. 3,913,327, Ronald L. Shellhause, issued Oct. 21, 1975.

The present invention provides a master cylinder comprising a housing forming longitudinal bore for movably receiving a pair of pistons, the housing also forming an outer wall extending substantially normal to an axis defined by the longitudinal bore to define a reservoir, the housing including a pair of ports leading from the reservoir to the longitudinal bore, the pair of pistons cooperating with the housing to substantially form a pair of pressure chambers normally communicating with the reservoir via the pair of ports, respectively, and the housing including a pair of outlet passages communicating the pair of pressure chambers with respective brake circuits in order to communicate fluid pressure from the pair of pressure chambers to the brake circuits when the pair of pistons are moved during braking to close the pair of ports, characterized by said housing including a boss protruding radially outwardly from said cylindrical body, said boss forming a bore defining a portion of one of said outlet passages and said boss further cooperating with said outer wall to substantially separate said reservoir into a pair of cavities for carrying fluid in each cavity.

It is an advantage of the present invention that the outlet passage is substantially disposed within the reservoir to compactly arrange that portion of the housing forming the outlet passage while at the same time providing a separation within the reservoir to define a pair of cavities for carrying fluid separately within the reservoir.

Figure 4:
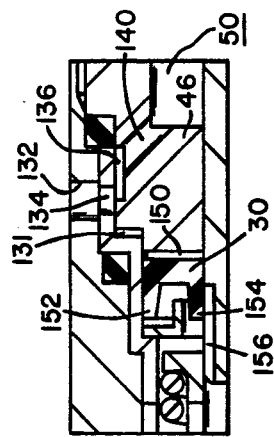
FIG. 4 is an enlarged view of the circumscribed portion 4 of FIG. 1.
Figure 1:
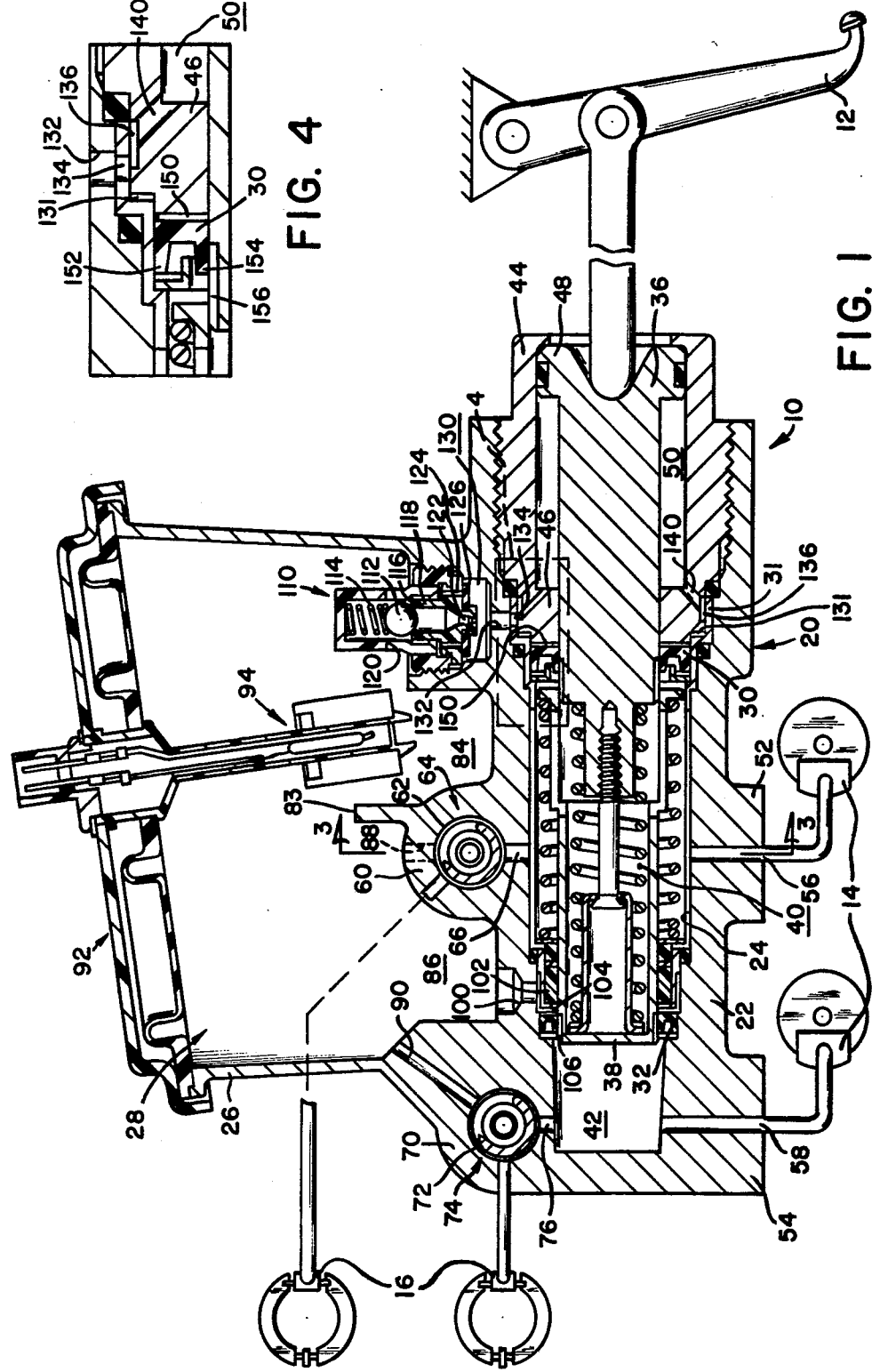
FIG. 1 is a side cross section of a master cylinder constructed in accordance with the present invention.
Figure 2:
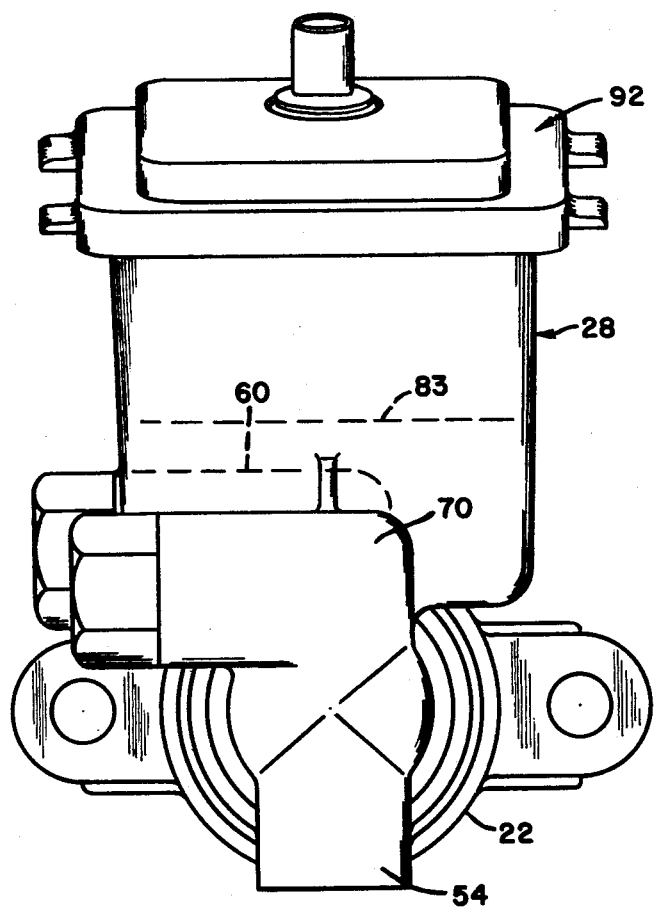
FIG. 2 is a left end view of the master cylinder shown in FIG. 1.

In FIG. 1 the master cylinder is generally referred to as reference numeral 10. The master cylinder 10 is arranged in a vehicle such that a brake pedal 12 is connected to the master cylinder to control actuation of the latter and fluid conduits connect the master cylinder 10 with a pair of front brakes 14 and a pair of rear brakes 16.

The master cylinder 10 is made in a die cast process from an metallic material, such as aluminum. A housing 20 forms a longitudinally extending cylindrical body portion 22 with a stepped bore 24 therein. The housing also forms a circumferential wall 26 extending from the body 22 normal to an axis for the bore in order to form a reservoir 28 for carrying brake fluid. A sleeve 31 is carried within the bore to define fixed positions for a pair of lip seals 32 and 30. A pair of pistons 36 and 38 cooperate with the wall of bore 24 and with the seals 32 and 30 to define a pair of pressure chambers 40 and 42. A bearing 44 extends into the housing bore 24 and is threaded for attachment to a threaded portion of the wall of bore 24. The bearing forms a radially inward end 46 engageable with the first piston 36 while a radially outward end 48 on the first piston 36 is sealingly engageable with the bearing 44. An auxiliary chamber 50 is formed by a radial spacing between the first piston 36 and the bearing 44.

The housing 20 forms a pair of downwardly directed projections 52 and 54 which define outlet openings 56 and 58, respectively. These outlet openings communicate with the respective pressure chambers 40 and 42 and with the front brake assemblies 14 so that fluid pressure generated in each pressure chamber is communicated to a respective front brake. The housing 20 further forms a first boss 60 which extends radially outwardly of the cylindrical body portion 22 and into the reservoir 28. The boss 60 defines a bore 62 with an axis normal to the axis of bore 24 and a proportioning valve assembly 64 is disposed within the bore 62. The bore 62 forms a portion of an outlet passage 66 to communicate pressure chamber 40 with one of the rear brakes 16 via the proportioning valve assembly 64. In a similar manner, the housing 20 also forms a second boss 70 which extends radially outwardly of the cylindrical body portion 22. The second boss 70 is connected with the circumferential wall 26 to form an outer boundary for the reservoir 28. The second boss 70 defines a bore 72 with an axis normal to the axis of bore 24 and a proportioning valve assembly 74 is disposed within the bore 72. The bore 72 is disposed slightly closer to the bore 24 than is the bore 62. The bore 72 forms a portion of an outlet passage 76 to communicate pressure chamber 42 with the other of the rear brakes 16 via the proportioning valve assembly 74.

Figure 3:
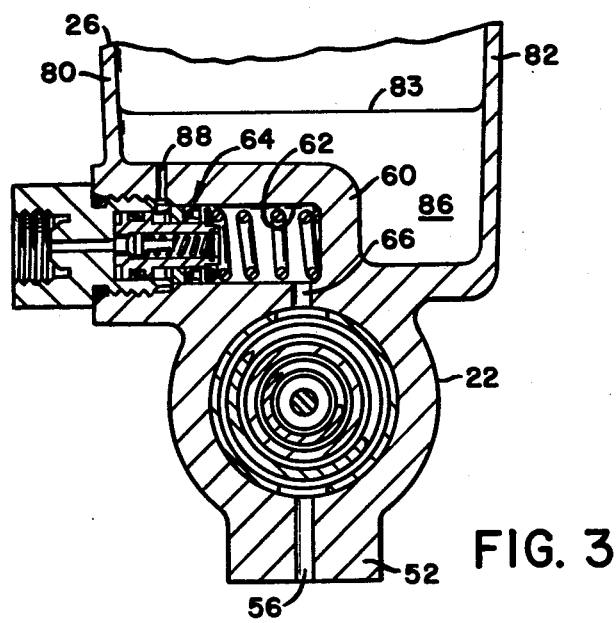
FIG. 3 is a cross section taken along line 3—3 of FIG. 1.

Viewing FIGS. 1 and 3, it is seen that the boss 60 extends from one side 80 of the circumferential wall 26 to a position in the reservoir which is more than one-half the distance between the one side 80 and an opposite side 82. Integrally formed with the boss 60 is a plate 83 extending between the sides 80 and 82 to form separate fluid carrying cavities 84 and 86 within the reservoir 28. As shown in FIG. 1, the plate 83 is offset on the boss 60 to provide room for a boss vent port 88 permitting fluid compensation to the proportioning valve assembly 64 from the reservoir. Similarly, the boss 70 forms a vent port 90 extending between the reservoir and the proportioning valve assembly 74.

The reservoir 28 is enclosed by a cover assembly 92 which carries a fluid level indicator 94 extending into the cavity 84.

Fluid carried within the reservoir 28 communicates with the pressure chamber 42 via a housing port 100, a clearance 102 between the sleeve and the wall of housing bore 24, a radial passage 104 between the left end of sleeve 31 and the right end of seal 32 and notches 106 on the left end of the piston 38. A valve assembly 110 is carried by the housing 22 within the reservoir 28 to control fluid communication to the pressure chamber 40 and the auxiliary chamber 50. The valve assembly comprises a ball valve member 112 biased by spring 114 against a notched seat 116 formed by body 118. The body forms slots 120 leading to a restricted bore 122 via the notch in seat 116 and also leading to openings 124 which normally are covered by a flapper valve 126. The retricted bore 122 communicates with the auxiliary chamber via a chamber 130, a housing port 132, a sleeve opening 134, an outer recess 136 formed on the end 46 of bearing 44, and a bearing opening 140. Also, the restricted bore 122 communicates with the pressure chamber 40 via a spacing 131 formed axially and radially between the bearing 44 and the sleeve 31, radial slots 150 formed at the left end of bearing 44, lips 152 and 154 on seal 30 and notches 156 on the piston 36.

During a brake application, the piston 36 is moved to the left viewing FIG. 1, so that the volume of auxiliary chamber 50 is contracted. Fluid pressure generated in auxiliary chamber 50 is communicated through the inteface between end 46 and piston 36 to the notches 156 past the inner lip 154 to establish a first fluid path from the chamber 50 to the chamber 40. Fluid pressure is also communicated from the interface at end 46 and piston 36 to the radial slots 150 and past the outer lip 152 of seal 30 to establish a second fluid path from the chamber 50 to the chamber 40. A third fluid path from chamber 50 to chamber 40 is established by the bearing opening 140, the outer recess 136, the interface or spacing 131 between the end 46 of bearing 44 and the sleeve 31 and past the outer lip 152 of seal 30. The second and third fluid paths between chambers 50 and 40 assume fluid will flow radially outwardly within the slots 150, however, it is possible for the fluid to flow radially inward within slots 150, threreby establishing two fluid paths from the outer recess 136 to the chamber 40 in addition to the already mentioned first fluid path.

Fluid pressure generated in the chamber 50 is also communicated to the reservoir 28 via a fluid path comprising the interface between end 46 and piston 36, slots 150, the interface between end 46 and sleeve 31 spacing 131, the outer recess 136, sleeve opening 134, port 132, chamber 130 and restricted bore 122. A second fluid path to the reservoir 28 is defined by bearing opening 140, outer recess 136, sleeve opening 134, port 132, chamber 130 and restricted bore 122. The fluid paths from the chamber 50 to the reservoir 28 both include the retricted bore 122 so that initially a greater portion of the fluid pressure generated in chamber 50 is communicated to the chamber 40 rather than to the reservoir 28.

With the piston 36 moving to the left, the fluid pressure within chamber 40 cooperates with the spring connecting the pistons 36 and 38 to move the piston 38 in order to generate fluid pressure within chamber 42. At some predetermined pressure level for chamber 50, the ball valve 112 is separated from the notched seat so that chamber 50 is opened to the reservoir thereby restricting the pressure within chamber 50 acting against piston 36. The fluid pressure within each chamber 40 and 42 is further communicated to the brakes 14 and 16. At some predetermined pressure level for chambers 40 nd 42, the proportioning valve assemblies within the bosses 60 and 70 are operable to restrict fluid pressure communication to the rear brakes 16. Upon termination of braking, the springs within the bore 24 bias the pistons to return to the rest portion illustrated in FIG. 1. In the rest position, the chamber 42 is in fluid communication with the reservoir cavity 86 as earlier described and the chamber 40 is also in fluid communication with the reservoir. As the piston 36 moves to the right upon termination of braking, the chamber 40 and the chamber 50 are expanded to reduce the fluid pressure therein. If the fluid trapped within the brake circuits is insufficient to fill the expanding pressure chambers 40 and 50, a pressure differential is created across the flapper valve 126 so that the valve opens to permit fluid from the reservoir to communicate with the chamber 130 and also with the chambers 40 and 50.

We claim:

1. A master cylinder comprising a housing forming a longitudinal bore for movably receiving a pair of pistons, the housing also forming an outer wall extending substantially normal to an axis defined by the longitudinal bore to define a reservoir, the housing including a pair of ports leading from the reservoir to the longitudinal bore, the pair of pistons cooperating with the housing to substantially form a pair of pressure chambers normally communicating with the reservoir, via the pair of ports, respectively, and the housing including a pair of outlet passages communicating the pair of pressure chambers with respective brake circuits in order to communicate fluid pressure from the pair of pressure chambers to the brake circuits when the pair of pistons are moved during braking to close the pair of ports, said housing including a first boss protruding radially outwardly from said cylindrical body, said first boss forming a bore defining a portion of one of said first pair of outlet passages, said first boss further cooperating with said outer wall to substantially separate said reservoir into a pair of cavities for carrying fluid in each cavity, said first boss bore defining an axis directly above and normal to the axis of said housing bore and offset so that a passage communicates said housing bore with said first boss bore, said housing including a second boss with a bore forming an axis directly above and normal to the axis of said housing bore and offset so that another passage communicates said housing bore with said second boss bore, said first and second boss bores being disposed substantially between said housing bore and said reservoir with axes extending substantially from one side of said reservoir to an opposite side of said reservoir in order that a pair of proportioning valve assemblies can be orientated compactly relative to said housing in communication with said reservoir and said housing bore via said first and second boss bores.

2. The master cylinder of claim 1 in which said outer wall is substantially rectangular in a horizontal plane to define a pair of sides and a pair of ends and said first boss extending from one of said sides toward but spaced from said other side to form a portion of one of said pair of cavities between said other side and an end of said first boss.

3. The master cylinder of claim 1 in which said housing forms a cylindrical body defining an outer cylindrical surface and said first boss bore forming a cylindrical wall which is substantially tangential to said outer cylindrical surface.

* * * * *